Figure 1:
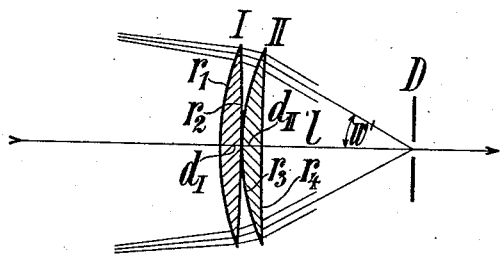

M. VON ROHR.
LENS SYSTEM.
APPLICATION FILED JULY 15, 1909.

940,895.

Patented Nov. 23, 1909.

Witnesses:
Paul Krüger
Fritz Sander

Inventor:
Moritz von Rohr

UNITED STATES PATENT OFFICE.

MORITZ VON ROHR, OF JENA, GERMANY, ASSIGNOR TO THE FIRM OF CARL ZEISS, OF JENA, GERMANY.

LENS SYSTEM.

940,895.  Specification of Letters Patent.  Patented Nov. 23, 1909.

Application filed July 15, 1909. Serial No. 507,770.

*To all whom it may concern:*

Be it known that I, MORITZ VON ROHR, a citizen of the German Empire, and residing at Carl-Zeiss strasse, Jena, in the Grand Duchy of Saxe-Weimar, Germany, have invented a new and useful Lens System, of which the following is a specification.

The present invention relates to a collective lens system for visual use consisting of two lenses, not cemented, but placed closely behind one another with a positive pair of facing surfaces, of which lenses the hinder one is collective and has a concave hinder surface, further having a large field of view and being astigmatically corrected for a small diaphragm situated about 3 cm. behind the hinder lens. A lens system according to this definition is one of the Zeiss Verant systems, in which a dispersive meniscus is employed as the front lens and a collective meniscus as the hinder lens. The Verant systems are designed to project a distant image of a plane object (a photograph for instance) arranged in the focal plane of the system. At the locus of the small hinder diaphragm, which was supposed in the construction, the eye as is well known is placed, so that its center of rotation—which during the movement of the eye in direct vision is the point of intersection of the principal rays corresponding to the different positions of the center of the pupil—occupies as near as possible the position of the center of the diaphragm.

As perfectly as the Verant systems are adapted to their proper task, namely, to render possible the correct viewing of photographs taken with an objective of the same short focal length, as is proper to the system of observation, as little they are suitable for certain other problems which likewise require a system of the general properties mentioned. For example, no one of the said Verant systems is applicable as a magnifying glass of medium power, because in the corresponding very short focal length the oblique pencils can no more be sufficiently corrected. Moreover, no one of the said systems can be employed for the purpose of correcting a highly hypermetropic or aphacic eye, since in this case the weight of the glass would be inadmissibly large. But according to the present invention for the said and similar purposes such a double lens collective system is qualified which belongs to the class described at the beginning and differs principally from the above mentioned one of the Verant systems (in which both lenses are meniscal, but only the hinder one collective) in that the front lens is also collective. If this new system be employed for solving the problems indicated, it is possible to eliminate astigmatism for a great inclination of the principal rays or at least to reduce it to a hardly perceptible degree. At the same time the distortion of the system can be removed to such an extent, that, in the specially unfavorable case of a spectacle glass intended to enable an aphacic eye for reading, it only amounts to a fraction of the distortion of a simple collective lens having the same focal length.

It may here be mentioned, that the French oculist Parent had already in the year 1897 (*Société d'Ophthalmologie*, page 350) stated the general idea of giving two lenses of short distance to the aphacic eye, in order that the "spherico-cylindrical correction" could be distributed over four surfaces instead of two, namely, over three spherical and one cylindrical surface. It will be understood, that for the correction of astigmatism, which the aphacic eye might possess, a plane surface need not necessarily be provided for conversion into a cylindrical one, it can also be effected by the conversion of a spherical surface of finite radius into a toric one.

In general, each constructional form of the new system has to be corrected for the special purpose to which it has to be applied. The application of a given form for another purpose than that for which it is designed is in most cases impossible in consequence of the difference in the degree of convergence of the pencils entering the system, which corresponds to the difference in the distance of the object. In some cases such application is further impossible on account of the difference in the degree of convergence required for the emerging pencil (entering the eye). From the same reasons one and the same external form of the new system does not permit of an equally good correction for all purposes of application. Hence investigation with reference to the form of the front lens has resulted in proving the biconvex form with regard to the correction of the system advantageous when the new system is employed as a magnifying glass of moderate power. On the other hand a powerful collective system for corrective spectacles can be most perfectly corrected for astigmatism, when its front lens is also a meniscus and has its concave surface also turned toward the diaphragm.

Figure 2:
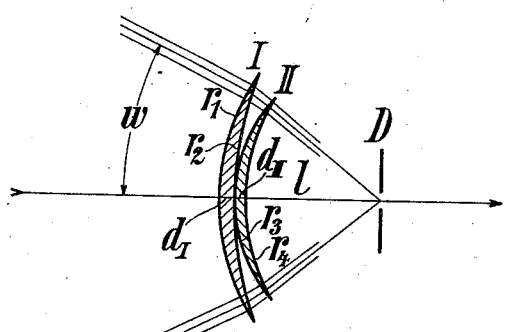
Figure 3:
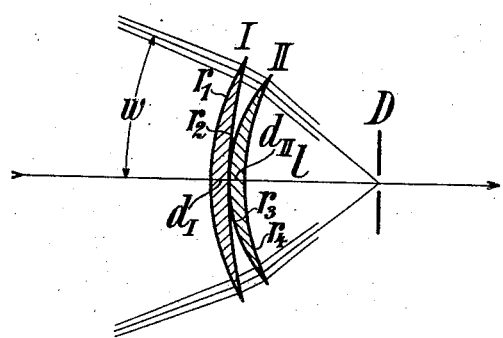

In the annexed drawing: Figure 1 is an axial section through a lens system constructed according to the invention. Fig. 2 is a similar section through another lens system. Fig. 3 is a similar section through a third lens system.

The lens system shown in Fig. 1 is a magnifying glass composed of two collective lenses which have the refractive index 1.52 and touch one another in the axis. The front lens I is biconvex, the hinder one II a meniscus having its concave surface turned toward the diaphragm D. The radii of curvature, the thicknesses at the vertex and the distance of the diaphragm are (for 44.4 mm. focal length, i. e., a magnification 250:44.4=5.6):

$r_1$=52.9 mm. $r_2$=300 mm. $r_3$=43.7 mm.
$r_4$=800 mm. $d_I$=4.0 mm. $d_{II}$=4.0 mm.
$l$=29.0 mm.

The astigmatic correction can be seen from the following table, in which according to the form of representation in use for photographic objectives the distances $s_s$ and $s_t$ are given as measured in the direction of the axis between the vertex of the front surface of lens I and the points of intersection of the two entering component pencils, the sagittal and tangential respectively, which correspond to a pencil emerging with parallel rays and with the inclination $w'$ to the axis.

| $w'$ | $s_f$ | $s_t$ |
|---|---|---|
| 0° | 42.97 mm. | 42.97 mm. |
| 20°.705 | 41.11 " | 41.16 " |
| 30° | 38.83 " | 38.19 " |

The double lens spectacle system of Fig. 2 corrects an aphacic eye for distance. The front lens I and the hinder lens II have both the refractive index 1.61. Both are menisci, which have the concave surface turned toward the diaphragm D, and touch each other in their vertices. The focal length is 91.63 mm. corresponding to a power of 11 dioptries. The radii of curvature, the thicknesses at the vertex and the distance of the diaphragm are:

$r_1$=43.0 mm. $r_2$=68.2 mm. $r_3$=29.2 mm.
$r_4$=38.6 mm. $d_I$=3.0 mm. $d_{II}$=2.0 mm.
$l$=26.0 mm.

Information as to astigmatic correction is given in the following statement of the values $s_s$ and $s_t$, being the true distances between the points of intersection of the emerging astigmatic pencils and the place where these pencils emerge from the hinder surface of lens II, as well as the inclination $w$, which the corresponding entering pencil has to the axis.

| $w$ | $s'_f$ | $s'_t$ |
|---|---|---|
| 0° | 86.08 mm. | 86.08 mm. |
| 17°.78 | 91.16 " | 90.95 " |
| 26°.365 | 97.72 " | 97.54 " |

The third example represented in Fig. 3 differs from that according to Fig. 2 only in the spectacles not being designed for distance but for reading purposes, where a plane object is situated at right angles to the axis and at a distance of 300 mm. from the vertex of the front surface of lens I. The refractive index is here also 1.61. The focal length is 69.98 mm. corresponding to a power of 14.3 dioptries. The radii of curvature, the thicknesses at the vertex and the distance of the diaphragm are:

$r_1$=46.04 mm. $r_2$=95.64 mm. $r_3$=30.5 mm.
$r_4$=46.3 mm. $d_I$=3.5 mm. $d_{II}$=2.8 mm.
$l$=26.0 mm.

The degree of the astigmatic correction is given by the following values:

| $w$ | $s'_f$ | $s'_t$ |
|---|---|---|
| 0° | 86.16 mm. | 86.16 mm. |
| 14°.859 | 90.34 " | 89.38 " |
| 21°.832 | 95.63 " | 93.49 " |

I claim:
1. A collective lens system for visual use over a large field, consisting of two simple collective lenses placed closely together with a positive pair of facing surfaces, the hinder lens having a concave hinder surface.

2. A collective lens system for visual use over a large field, consisting of two simple collective lenses placed closely together with a positive pair of facing surfaces, the hinder lens having a concave hinder surface and the system being astigmatically corrected for a narrow diaphragm lying about 3 cm. behind the vertex of the hindmost surface.

3. A collective lens system for visual use over a large field, consisting of two simple collective lenses placed closely together with a positive pair of facing surfaces, each lens having a concave hinder surface and the system being astigmatically corrected for a narrow diaphragm lying about 3 cm. behind the vertex of the hindmost surface.

MORITZ VON ROHR.

Witnesses:
PAUL KRÜGER,
FRITZ SANDER.